United States Patent [19]

Miura et al.

[11] Patent Number: 4,630,252

[45] Date of Patent: Dec. 16, 1986

[54] CONTROL APPARATUS FOR OPTICAL DISC PLAYER FOR LOCATING BLANK TRACKS

[75] Inventors: Yoshio Miura; Tooru Fujishima, both of Yokohama; Masuo Oku, Kamakura; Yoshimichi Kudo, Yokohama; Chiharu Takayama; Tooru Kawashima, both of Kamakura, all of Japan

[73] Assignee: Hitachi, Ltd., Tokyo, Japan

[21] Appl. No.: 564,902

[22] Filed: Dec. 23, 1983

[30] Foreign Application Priority Data

Dec. 24, 1982 [JP] Japan ................................ 57-226263

[51] Int. Cl.$^4$ .............................................. G11B 7/00
[52] U.S. Cl. ........................................ 369/44; 369/33; 369/46
[58] Field of Search ................................... 369/44–46, 369/33, 41, 43, 50; 358/342; 360/78

[56] References Cited

U.S. PATENT DOCUMENTS 4,317,190 2/1982 Iyeta ...................................... 369/33
4,520,469 5/1985 Todokoro et al. ..................... 369/44

Primary Examiner—Robert L. Richardson
Attorney, Agent, or Firm—Antonelli, Terry & Wands

[57] ABSTRACT

An optical disc player for optically recording the video information or audio information onto a recording medium or optically reproducing the recorded information. The disc player includes a search unit for searching an information track having no signals recorded thereon prior to additionally recording an information signal on the unrecorded track. The search unit has a level detection circuit for detecting the energy value of the light reflected by the recording medium or an RF signal detection circuit for detecting the RF signal component. When the reflected light energy exceeds a predetermined value or the RF signal component is not detected, the search unit regards the track as a track having no signals recorded thereon, the search operation for a track having no signals being terminated and information can be recorded of the track having no signals recorded thereon.

6 Claims, 7 Drawing Figures

CONTROL APPARATUS FOR OPTICAL DISC PLAYER FOR LOCATING BLANK TRACKS

BACKGROUND OF THE INVENTION

The present invention relates to a control apparatus of an optical disc player for optically recording video information or audio information on an information track formed on the record medium and for reproducing the signal recorded on the information track. The present invention relates, in particular, to a player which has a device for discriminating a track having no signals recorded thereon and which has a function of correctly searching a track having no signals recorded thereon by rapidly moving a signal recording/reproducing means on the recording medium prior to additionally recording an information signal on the track having no signals recorded thereon.

An example of a conventional apparatus for recording/reproducing the video information or the audio information is an optical recording/reproducing apparatus such as an optical video disc player or an optical audio player which records/reproduces the information using an optical approach. That apparatus has a function of focusing a light beam generated from a light source onto a disc-shaped record medium (hereinafter referred to as a disc) to record signals in a concentrical or helical form on the disc and has a function of detecting the reflected light fed from the disc to read this signal recorded on the record medium. FIG. 1 shows a block diagram of that optical recording/reproducing apparatus.

A disc 1 is a medium for recording the information and is rotated at the rate of 1,800 rpm, for example, by a disc rotating motor 2. In an information recording operation, the video signal fed from a TV camera or the like is subjected to frequency modulation in a record modulation circuit 3 to be carried over a carrier frequency belonging to a desired frequency band. In accordance with the signal thus modulated, a laser drive circuit 4 varies the current flowing into a laser diode 5. The intensity of the light beam emitted by the laser diode 5 is thus varied. The light beam is used to record the signal on the disc 1. Owing to the use of a laser diode as a light source, a single light source suffices to record and reproduce the information. As a result, it is possible to reduce the overall size and dissipated power of the apparatus. In addition, direct modulation and control of the recording light beam may be easily carried out. The light beam generated by the laser diode 5 is passed through a lens 6 and a semitransparent mirror (half mirror) 7. The direction of the light beam is altered by a mirror 8. The resultant light beam is focused onto the disc 1 placed over the disc rotating motor 2 by a condenser lens 9. The light beam reflected by the disc 1 is passed through the condenser lens 9. The direction of the light beam is then altered by the mirror 8 and the semitransparent mirror 7. After passing through a lens 10, the light beam is divided into two parts by a mirror 11. One part is fed to a pair of photosensitive diodes 13a and 13b and the other part is fed to another pair of photoresistive diodes 12a and 12b. Signals fed from photosensitive diodes 13a and 13b are respectively fed to amplifiers 17c and 17d to be amplified. The signals thus amplified are fed to a differential amplifier circuit 18 to yield the difference between them. According to the difference signal, a well known focus control unit controls the position of the condenser lens 9 so that the diameter of the focused light beam will be approximately 1 $\mu$m. On the other hand, signals fed from the photosensitive diodes 12a and 12b are amplified by amplifiers 17a and 17b and then fed to a differential amplifier or subtracter 24 to yield the difference signal between those signals. The difference signal or tracking control signal drives a tracking control signal generating circuit 25 and a drive circuit 26. The angle of the mirror 8 attached, to the tracking control element 14 is varied so that the light beam focused onto the disc 1 may correctly scan signals on the track, resulting in tracking control.

When the information recorded on the disc 1 is to be reproduced, the optical output of the laser diode 5 is set to a value is lower than its optical output value in the recording operation. The light beam generated by the laser diode 5 is passed through the intermediate lens 6 and the semitransparent mirror 7 in the same way as in the recording operation. The direction of the lgiht beam is then altered by the mirror 8. The condenser lens 9 focuses the light beam onto the disc 1. The light beam reflected by the disc 1 is passed through the condenser lens 9 again. The direction of the light beam is then altered by the mirror 8 and the semitransparent mirror 7. After passing through the lens 10, the light beam is split into two parts by the mirror 11. One part is fed to photosensitive diodes 13a and 13b to be used as the reproduced video signal and the focus control signal. The other part is fed to photosensitive diodes 12a and 12b to be used as the tracking control signal in the reproducing operation. The signals sent out from the photosensitive diodes 13a and 13b are added in a summing circuit 19. The resultant sum signal or modulated video signal is fed to a video signal reproducing circuit 20 to demodulate the original video signal. The video signal thus reproduced includes an address signal corresponding to a track which is recorded in the vertical blanking line period, for example. An address discrimination circuit 21 reads out the address signal of the record track and feeds it to a microcomputer 22.

Referring to the conventional circuit illustrated in FIG. 1, the operation for searching a desired track on the disc 1 will now be described. An address corresponding to a desired track is specified through a keyboard 23. Thereafter, a start instruction is inputted using keys arranged on the keyboard 23. The microcomputer 22 calculates the difference between the specified address and the current track address fed from the address discrimination circuit 21. The resultant difference is preset into a coincidence detection circuit 28. The coincidence detection circuit 28 is usually composed of an up/down counter and a digital-analog converter. The output signal of the counter is converted into an analog voltage by a digital-analog converter (hereafter abbreviated as DAC). The resultant analog voltage is fed to a motor drive circuit 29 to drive a motor 30. The motor 30 in turn moves a movable table 16 in the radial direction of the disc 1. Each time the light beam focused by the condenser lens 9 crosses a track during the movement of an optical system 15 placed on the movable table 16, a waveform shaping circuit 27 provided for shaping the waveform of the output signal from the differential amplifier 24 produces a pulse signal. This pulse signal is fed to the counter included in the coincidence detection circuit 28 in the down mode. The speed of the motor 30 is controlled by the output voltage of the coincidence detection circuit 28.

In summary, when an additional signal is to be recorded on a track of the disc 1 having no signals recorded thereon, address signals recorded beforehand on portions corresponding to vertical blanking line periods are detected to search for a desired record track. The prior art has the following problems.

(1) Since the optical system 15 must be moved while detecting address signals, high speed transfer of the optical system 15 is difficult, resulting in a long search time.

(2) If the current address is not detected as a correct value, the optical system 15 passes a desired track, necessarily bringing about a long search time.

(3) The prior art is not applicable to a disc having no addresses recorded beforehand thereon.

SUMMARY OF THE INVENTION

An object of the present invention is to provide an optical disc player in which the optical system can rapidly access to a track having no signals recorded thereon prior to additionally recording an information signal on the track having no signal recorded thereon.

For the purpose of detecting a track having no signals recorded thereon, in accordance with the present invention, the level of the output signal of the differential amplifier used to produce the tracking control signal is detected and change in such a level is supervised in view of the fact that the signal level for a track having signals recorded thereon is largely different from that for a track having no signals recorded thereon. Otherwise the output signal of the summing circuit which is used as the reproduced video signal is subjected to envelope detection and a track having no signals recorded thereon is discriminated by the fact that the detected output level is zero or below a predetermined threshold level. The signal thus detected forcibly stops the motor.

DESCRIPTION OF THE PREFERRED EMBODIMENTS

Figure 1:
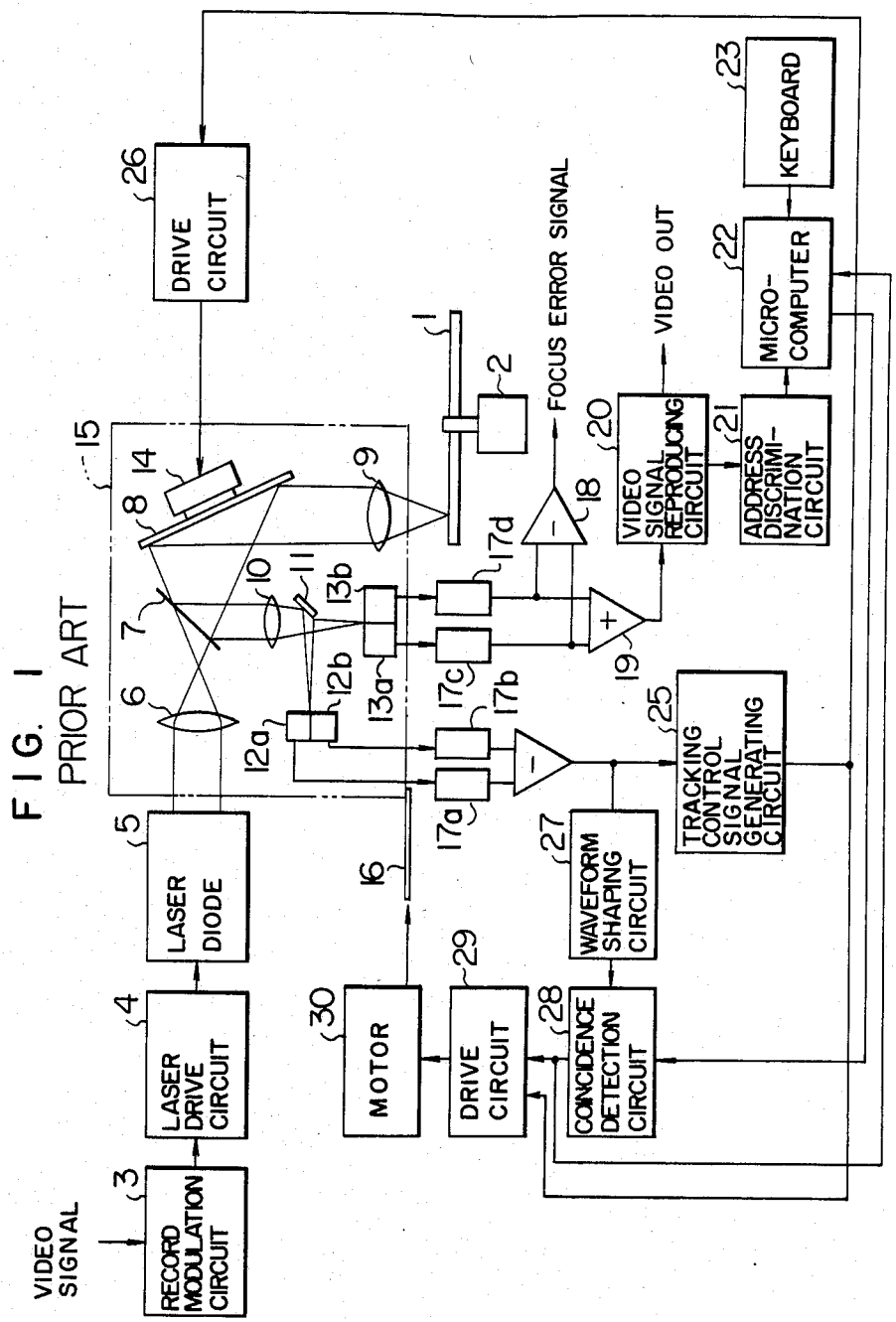
FIG. 1 is a block diagram of a principal part of a disc player according to the prior art.
Figure 2:
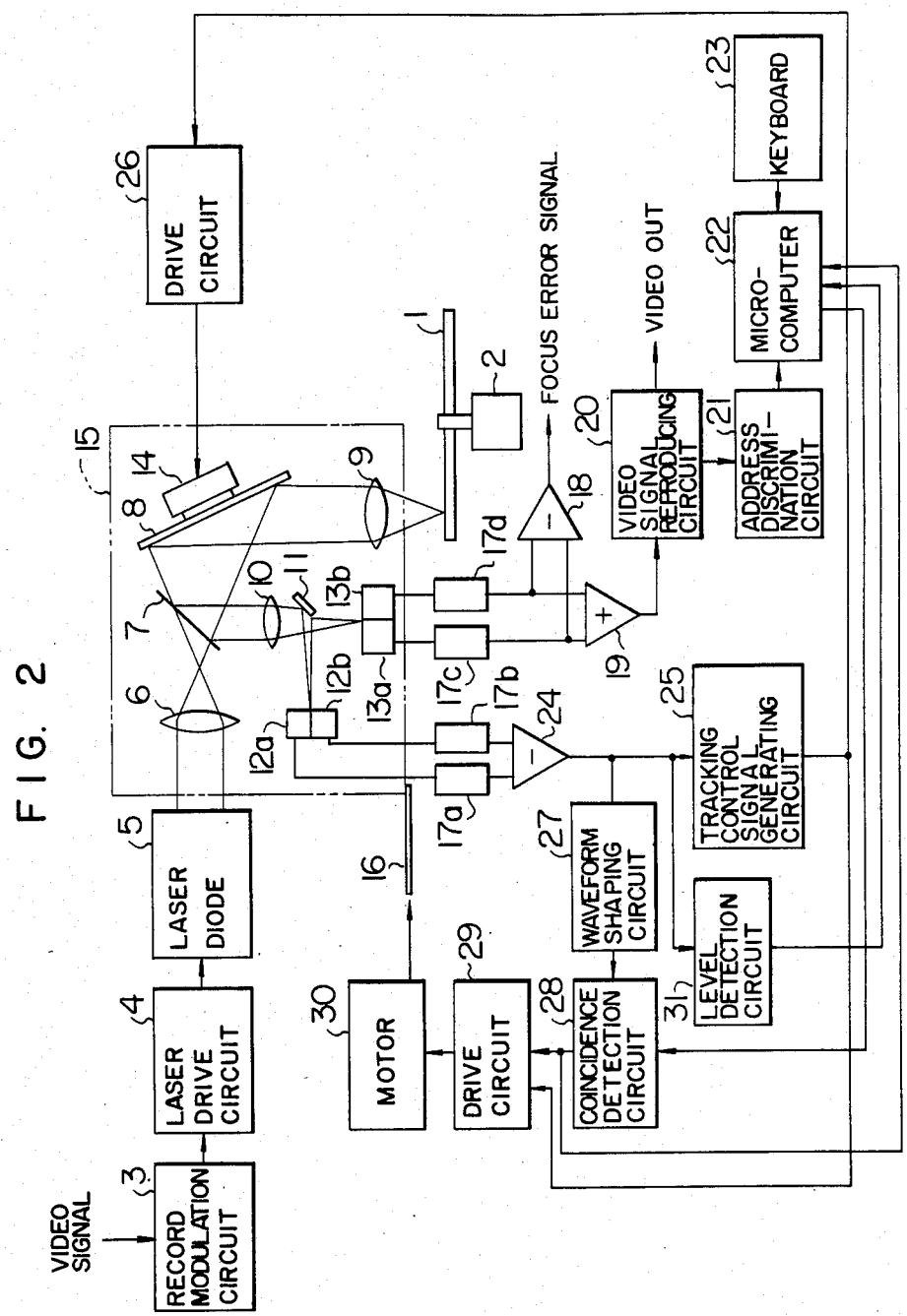
FIG. 2 is a block diagram of a principal part of a first embodiment of a disc player according to the present invention.

Embodiments of the present invention will now be described by referring to appended drawings. FIG. 2 is a block diagram for illustrating a first embodiment of a disc player according to the present invention.

Figure 3A:
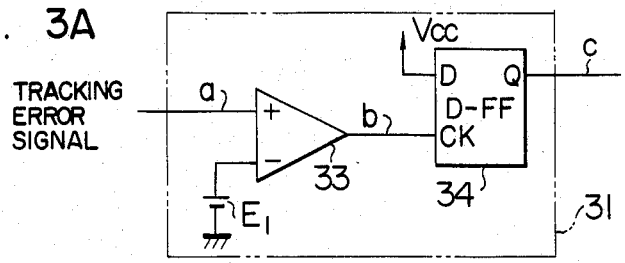
FIG. 3A is a block diagram for illustrating the circuit configuration of a level detection circuit used in the disc player according to the present invention.
Figure 3B:
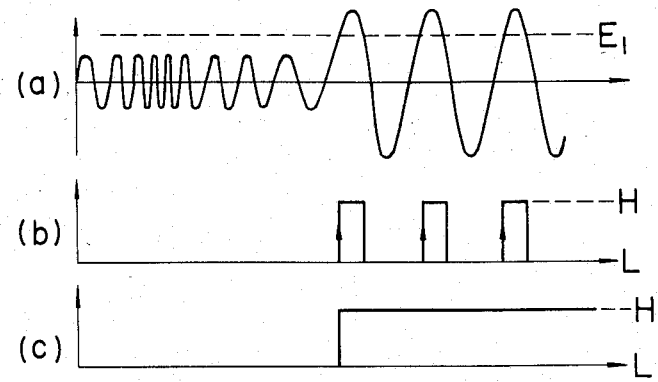
FIG. 3B illustrates waveforms at principal points of the level detection circuit illustrated in Fig. 3A.

Referring to FIG. 2, operation for positioning an optical system 15 over a track having no signals recorded thereon will now be described. Assume now that an instruction inputted to a microcomputer 22 through a keyboard 23 specifies a track address which is larger than the largest track address deemed to have signals recorded thereon. The difference between the specified track address and the current track address is calculated by the microcomputer 22. The calculated result is preset in a coincidence detection circuit 28. At the same time, a drive circuit 29 for controlling a motor 30 is activated by a start instruction inputted from the keyboard 23. As a result, the motor 30 is rotated to displace a movable table 16 toward the external periphery of a recording medium 1. Accordingly, the optical system 15 also begins to move toward the periphery of the recording medium 1. On the recording medium 1, signals are successively recorded on recording tracks beginning with the central track and gradually approaching the track located on the periphery. Every time the light spot crosses a recording track during movement of the optical system 15, a sinusoidal waveform appears in the output of the differential amplifier 24. The waveform of this signal is shaped in a waveform shaping circuit 27 to form a pulse. This pulse is fed to the coincidence detection circuit 28 comprising a down counter as a clock pulse. Since the speed of the motor 30 is controlled by the analog voltage resulting from digital-analog conversion of the output of the coincidence detection circuit 28, the movable table 16 is moved toward a track of destination until the output signal of the coincidence detection circuit 28 reaches zero. On the other hand, the output of the differential amplifier 24 is fed also to a level detection circuit 31 for level detection. The level detection circuit 31 is configured as illustrated in FIG. 3A, for example. FIG. 3B shows waveforms of signals appearing at various points in the circuit of FIG. 3A. Since the reflectability of a track having no signals recorded thereon is larger than that of a track having signals recorded thereon, the level of the tracking error signal fed from the track having no signals recorded thereon is higher than that of the track having signals recorded thereon as illustrated in FIG. 3B($a$). The tracking error signal is compared with the reference voltage $E_1$ in a comparator 33. FIG. 3B($b$) shows the output signal of the comparator 33. The output signal of the comparator 33 is fed to a delayed flip-flop (D-FF) 34. When the light spot has reached a track having no signals recorded thereon, therefore, a high level signal (H) appears at the output Q of the D-FF 34. The H signal is fed to the microcomputer 22. Upon detecting the occurrence of the high level signal H, the microcomputer 22 generates a signal for bringing the drive circuit 29 into the OFF state. The signal thus generated is fed to the drive circuit 29 via the coincidence detection circuit 28 to stop the motor 30.

That is to say, in this embodiment, the difference between the energy of the reflected light obtained when a laser beam is applied onto a track having signals recorded thereon and that of the reflected light obtained when a laser beam is applied onto a track having no signals recorded thereon is detected by the differential amplifier 24. When the energy of the reflected light exceeds a predetermined value, the laser beam is judged applied onto a track having no signals recorded thereon and the rotation of the motor 30 is forcibly stopped. Even if the counter included in the coincidence detection circuit 28 has not reached zero in this case, the rotation of the motor 30 is stopped. In the embodiment illustrated in FIG. 2, the output signal of the level detection circuit 31 is fed to the microcomputer 22. Even if the output signal of the level detection circuit 28 is directly fed to the coincidence detection circuit 28 to reset the circuit 28, however, the rotation of the motor may be stopped.

Figure 5A:
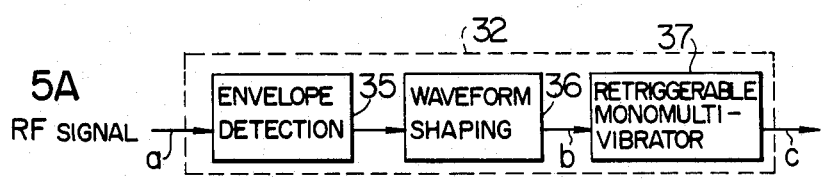
FIG. 5A is a block diagram for illustrating the circuit configuration of an RF signal detection circuit used in the disc player according to the present invention.
Figure 5B:
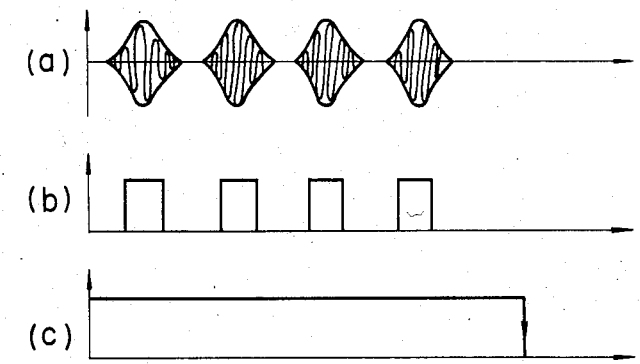
FIG. 5B illustrates waveforms at principal points of the RF signal detection circuit illustrated in FIG. 5A.
Figure 4:
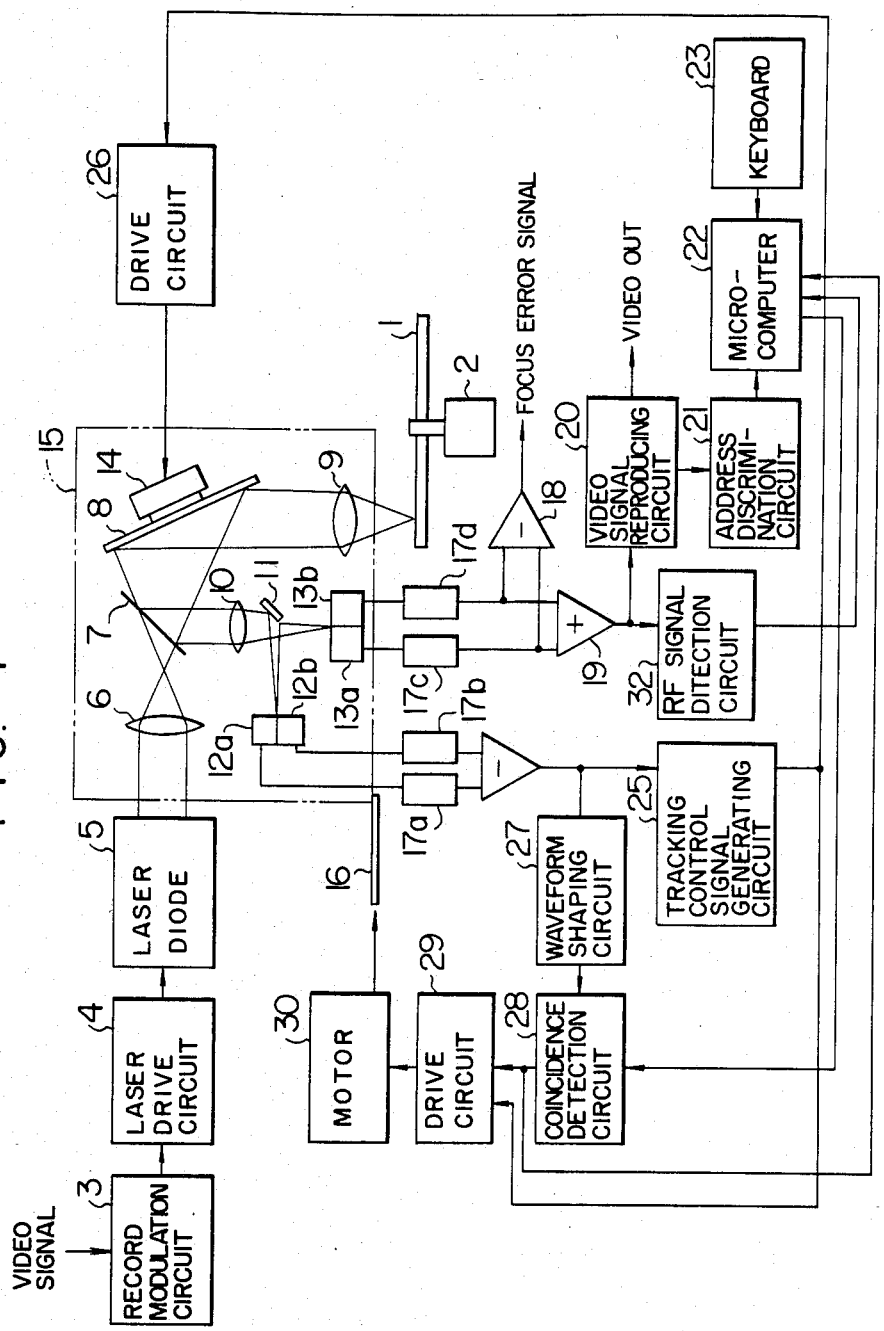
FIG. 4 is a block diagram of a principal part of a second embodiment of a disc player according to the present invention.

FIG. 4 shows a second embodiment of the present invention. In the embodiment illustrated in FIGS. 4, a track having no signals recorded thereon is detected by using the amplitude value of the reproduced RF signal. Excepting this point, the embodiment of FIG. 4 is the same as that of FIG. 2. During the movement of the optical system 15, the output signal of the summing circuit 19 has a waveform as illustrated in FIG. 5B(a). This output signal is fed to an RF signal detection circuit 32. The RF signal detection circuit 32 is configured as illustrated in FIG. 5A, for example. FIG. 5B illustrates waveforms of signals at points included in the circuit of FIG. 5A. The RF signal fed to the RF signal detection circuit 32 is detected in an envelope detection circuit 35. The waveform of the signal thus detected is shaped in a waveform shaping circuit 36 to have a waveform as illustrated in FIG. 5B(b). The signal having a shaped waveform is fed to a retriggerable multivibrator having a time constant which is longer than the repetition period of pulses illustrated in FIG. 5B(b). Since a track having no signals recorded thereon does not produce an RF signal, the input signal of the retriggerable multivibrator 37 then has a level below the threshold voltage. As a result, the output of the multivibrator 37 changes from the high level H to the low level L. The output signal of the multi-vibrator 37 is fed to the microcomputer 22, for example. The output signal of the microcomputer 22 in turn resets the coincidence detection circuit 28 to stop the motor 30.

In the second embodiment as well, the rotation of the motor 30 is stopped when the coincidence detection circuit 28 is reset directly by the output signal of the RF signal detection circuit 32. When the light spot focused onto the disc 1 by the condenser lens 9 of the optical system 15 has moved from a track having signals recorded thereon to a track having no signals recorded thereon, therefore, the movement of the optical system 15 is immediately stopped. Accordingly, the light spot focused onto the disc 1 is positioned on the track having no signals recorded thereon which is adjacent to the track having signals recorded thereon. Therefore, if becomes possible to effect additional recording of an information signal on an unrecorded track.

In accordance with the present invention as described above, a level detection circuit receiving the tracking control signal which is fed to the tracking control circuit is provided as one means for discriminating a track having no signals recorded thereon. The level detection circuit detects the difference between the energy of the reflected light obtained when a laser beam is applied onto a track having signals recorded thereon and the energy of the reflected light obtained when a laser beam is applied onto a track having no signals recorded thereon. When the energy of the reflected light has exceeded a predetermined value, the level detection circuit produces an output signal to stop the rotation of the motor for moving the optical system. As a result, the laser beam applied onto the disc by the optical system is positioned over the track having no signals recorded thereon.

As another means for discriminting a track having no signals recorded thereon, an RF signal detection circuit receiving the modulated video signal which is fed to the video signal reproducing circuit is provided. The RF signal detection circuit detects the presence or absence of the modulated video signal. When the modulated video signal is not detected, the RF signal detection circuit produces an output signal to stop the rotation of the motor for moving the optical system. As a result, the laser beam applied onto the disc by the optical system is positioned on a track having signals recorded thereon.

We claim:

1. A control apparatus for an optical disc player comprising:

a light source for emitting a light beam;

a disc-shaped information recording medium having information tracks formed thereon for the recording of information signals, said light beam from said light source being irradiated on the information tracks of the recording medium for reflection therefrom as an optical signal, an information track having no recorded information signal more intensively reflecting the irradiated light beam than a track having an information signal recorded thereon.

an optical system including a plurality of optical lenses and a plurality of tracking members for introducing said light beam from said light source onto said disc-shaped recording medium;

a pair of photodiodes receiving said optical signal of the reflected light beam from said recording medium and converting said optical signal into a pair of electrical signals;

a subtraction circuit for receiving said pair of electrical signals from said photodiodes, and for producing a difference signal indicative of the difference therebetween;

tracking control means responsive to the difference signal from said subtraction circuit for driving said tracking members of said optical system and for correctly positioning said light beam from said light source onto an information track of said recording medium;

optical system movement means including a motor and a drive circuit for driving the motor and for moving said optical system in a radial direction of said disc-shaped recording medium;

detecting means for detecting an information track having no recorded information signal, said detection means including a signal level detection circuit for receiving the difference signal from said subtraction circuit and for producing an output signal when the amplitude of the difference signal exceeds a predetermined value, said predetermined value being set at an intermediate value between the amplitude of a first difference signal obtained from the light beam reflected from an information track having an recorded information signal and the amplitude of a second difference signal obtained from an information track having a recorded information signal, said detection means stopping the movement of said movement means in response to the output of said level detection circuit.

2. A control apparatus according to claim 1, wherein said signal level detection circuit includes:

a comparison circuit for comparing the amplitude of the difference signal from said subtraction circuit with a predetermined voltage and producing a pulse signal when the difference signal exceeds the predetermined voltage value; and a delayed flip-flop connected to said comparison circuit for receiving the pulse signal of said comparison circuit and for providing an output in accordance therewith.

3. A control apparatus according to claim 1, wherein said light source includes a laser diode.

4. A control system for an optical disc player comprising:
- a light source for emitting a light beam;
- a disc-shaped information recording medium having information tracks formed thereon for the recording of information signals, said light beam from said light source being irradiated on the information tracks of said recording medium and being reflected therefrom as an optical signal, an information track having no recorded information signal more intensively reflecting the irradiated light beam than a track having a recorded information signal;
- an optical system including a plurality of optical lenses and a plurality of tracking members for introducing the light beam from said light source onto said disc-shaped recording medium;
- a first pair of photodiodes for receiving said optical signal of the reflected light beam through at least a portion of said optical system and for converting the received optical signal into a first pair of electrical signals;
- a second pair of photodiodes for receiving said reflected light beam and for converting said reflected light beam into a second pair of electrical signals;
- a subtraction circuit for receiving the first pair of electrical signals of said first pair of photodiodes and for producing a difference signal indicative of the difference therebetween;
- an adding circuit responsive to the second pair of electrical signals of the second pair of photodiodes for adding the second pair of electrical signals to each other to produce an RF signal;
- tracking control means responsive to the difference signal from said subtraction circuit for driving said tracking members of said optical system and for correctly positioning the light beam from said light source onto an information track of said recording medium;
- optical system movement means including a motor and a drive circuit for driving the motor and for moving said optcial system in a radial direction of said disc-shaped recording medium; and
- detection means for detecting an information track having no recorded information signal, said detection means including an RF signal detecting circuit for receiving the RF signal from said adding circuit, said RF signal detecting circuit generating an output signal for enabling said movement means to move said optical system when said RF signal is detected, and for stopping generating of said output signal when the RF signal is not detected to thereby stop said movement means.

5. A control apparatus according to claim 4, wherein said RF signal detecting circuit includes an envelope detection circuit for detecting the envelope of the RF signal, a waveform shaping circuit connected to said envelope detection circuit, and a retriggerable monostable multivibrator connected to said waveform shaping circuit for providing the output signal.

6. A control apparatus according to claim 4, wherein said light source includes a laser diode.

* * * * *